US012682757B2

(12) United States Patent
Bryant et al.

(10) Patent No.: US 12,682,757 B2
(45) Date of Patent: Jul. 14, 2026

(54) SYSTEM AND METHOD FOR MANAGING PARKING AREAS BY WAY OF PREAUTHORIZATION AND FORECASTING

(71) Applicant: Vacation Rental Parking Solutions, Inc., Mobile, AL (US)

(72) Inventors: Sean Michael Bryant, Saraland, AL (US); Jason Michael Cruthirds, Mobile, AL (US); John Leo Strope, III, Mobile, AL (US); James Steven Weber, Mobile, AL (US)

(73) Assignee: Vacation Rental Parking Solutions, Inc., Mobile, AL (US)

( * ) Notice: Subject to any disclaimer, the term of this patent is extended or adjusted under 35 U.S.C. 154(b) by 278 days.

(21) Appl. No.: 18/380,124

(22) Filed: Oct. 13, 2023

(65) Prior Publication Data
US 2025/0124792 A1     Apr. 17, 2025

(51) Int. Cl.
*G08G 1/14*      (2006.01)
*G06F 16/00*      (2019.01)
*G06K 19/06*      (2006.01)

(52) U.S. Cl.
CPC ............. *G08G 1/145* (2013.01); *G06F 16/00* (2019.01); *G06K 19/06009* (2013.01)

(58) Field of Classification Search
CPC ... G08G 1/145; G06F 16/00; G06K 19/06009
See application file for complete search history.

(56) References Cited

U.S. PATENT DOCUMENTS

| | | | |
|---|---|---|---|
| 2014/0100894 A1* | 4/2014 | Ariemma | ............... G06Q 10/02 705/5 |
| 2017/0351975 A1* | 12/2017 | Webb | ...................... G06Q 10/02 |
| 2020/0258388 A1* | 8/2020 | Nakka | .................... G08G 1/143 |

* cited by examiner

*Primary Examiner* — Davetta W Goins
*Assistant Examiner* — Sharmin Akhter
(74) *Attorney, Agent, or Firm* — AdamsIP, LLC; Edward Brinkley Garner, III; James Hunter Adams

(57) ABSTRACT

A system and method for managing a parking area of a rental complex is provided. Generally, a user may use the user interface of the system to input data pertaining to individual units of a rental complex, wherein each individual unit is associated with at least one parking space of a parking area. The parking space may have a specific location within a parking area or generally refer to one parking space of a plurality of parking spaces within a parking area. Preauthorization rules of the system dictate the maximum number of parking spaces a user of the system may be allocated at a given time. Users may manipulate user interfaces of the system to generate parking passes. In some embodiments, scanning devices may be used to help monitor parking areas by scanning parking passes generated by the system.

20 Claims, 15 Drawing Sheets

411

430A

Add a New Reservation ×

| Rental Company |

| Individual Unit Number |

| Accommodation Confirmation Number |

Start Date & Time

| Start Date | Start Time |

End Date & Time

| End Date | End Date |

| User Name |

| User Email | User Phone |

| Add Reservation |

Example user interface allowing for the input of accommodation data by an owner or rental management company.

411

605

Example user interface allowing
for the creation of a guest pass
or visitor pass by a user.

411

430A

Example user interface allowing for the creation of a guest pass by a user via the input of accommodation data.

411

Example user interface allowing for the creation of a visitor pass by a user via the input of accommodation data.

411 ⌐

430A

Example user interface allowing for a user to purchase created parking passes.

413

GUEST PARKING

VEHICLES MUST BE REGISTERED WHILE PARKED

TO REGISTER SCAN OR GO TO
XX.XXXXXXXXXXX.com

NAME OF RENTAL COMPLEX

1300

1400

1500

SYSTEM AND METHOD FOR MANAGING PARKING AREAS BY WAY OF PREAUTHORIZATION AND FORECASTING

FIELD OF THE DISCLOSURE

The subject matter of the present disclosure refers generally to a system and method for managing parking areas of a rental complex.

BACKGROUND

Managing parking areas of rental complexes located in regions that attract high amounts of tourism is a multifaceted challenge due to a combination of factors, including, but not limited to, limited space, high demand, seasonal fluctuations, owner vs guest parking, visitor registration control, traffic congestion, public beach access, parking enforcement, infrastructure maintenance, environmental concerns, and high residential turnover. Though some factors that make the management of parking areas difficult will have relatively little impact on day-to-day activity, other factors can make the efficient management of parking areas virtual impossible. This is especially true for beachfront rental complexes where scarcity of available space and the extremely high demand for parking becomes a significant problem, particularly during peak seasons or holidays when beachgoers flock to the area.

Beach destinations are notorious for experiencing significant seasonal fluctuations in visitor numbers. During the summer months or holidays, the number of tourists and day-trippers can steeply rise, resulting in parking infrastructure that is easily overwhelmed if not closely monitored. Additionally, complications commonly arise between owners who reside at beachfront rental complexes and guests who are temporarily visiting the beachfront rental complex since owners naturally desire to have a minimum number of guaranteed parking spot for their vehicles and guests naturally expect a number of guaranteed parking spaces for the duration of their visit. Balancing these competing needs while ensuring fairness can be challenging. However, enforcing parking rules and regulations is essential for maintaining order and fairness even if it can be a difficult and often contentious task. Residents or guests who receive parking violations may dispute the charges, leading to conflicts within the community. To address this, dedicated parking enforcement personnel or services may be used, but this can often be a very expensive that is only needed during peak tourism season.

Accordingly, there is a need in the art for a system and method for managing parking areas of a rental complex in a way that increases efficiency and accounts for fluctuations to reduce conflict within the community.

SUMMARY

Generally, a user may use the user interface of the system to input data pertaining to individual units of a rental complex, wherein each individual unit is associated with at least one parking space of a parking area. The parking space may have a specific location within a parking area or generally refer to one parking space of a plurality of parking spaces within a parking area. Preauthorization rules of the system dictate the maximum number of parking spaces a user of the system may be allocated at a given time. The system may also be used by a user to purchase/sell rights associated with the use of parking spaces of a parking area.

In some preferred embodiments, the system may be used to project a number of parking spaces that will be available at a given time as well as estimate the minimum staffing required for a rental complex based on the amount of residential overturn, which may then be used to adjust the amount of parking spaces available for other users of the system. In another preferred embodiment, the system may actively monitor a parking area and send alerts to rental complex security and/or security services should an unauthorized vehicle be parked in the parking area.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other systems for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally. The term "comprises", and grammatical equivalents thereof are used herein to mean that other components, steps, etc. are optionally present. For instance, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

In a preferred embodiment, a parking area may be defined as an area of a rental complex designated for the parking of vehicles belonging to owners, guests, visitors, and vendors. An owner may be defined as a user who owns at least one individual unit of a rental complex. A guest may be defined as a user who has been granted permission from an owner to stay in a unit belonging to the owner for at least one night. A visitor may be defined as a user who has been granted permission from an owner and/or a guest to visit a unit belonging to the owner but not overnight. A vendor may be defined as a user who has been granted permission by at least one user to perform a commercial transaction on the premises of a rental complex. As will be evident from the disclosure provided below, the present invention satisfies the need for a system and method for managing a parking area of a rental complex.

Figure 1:
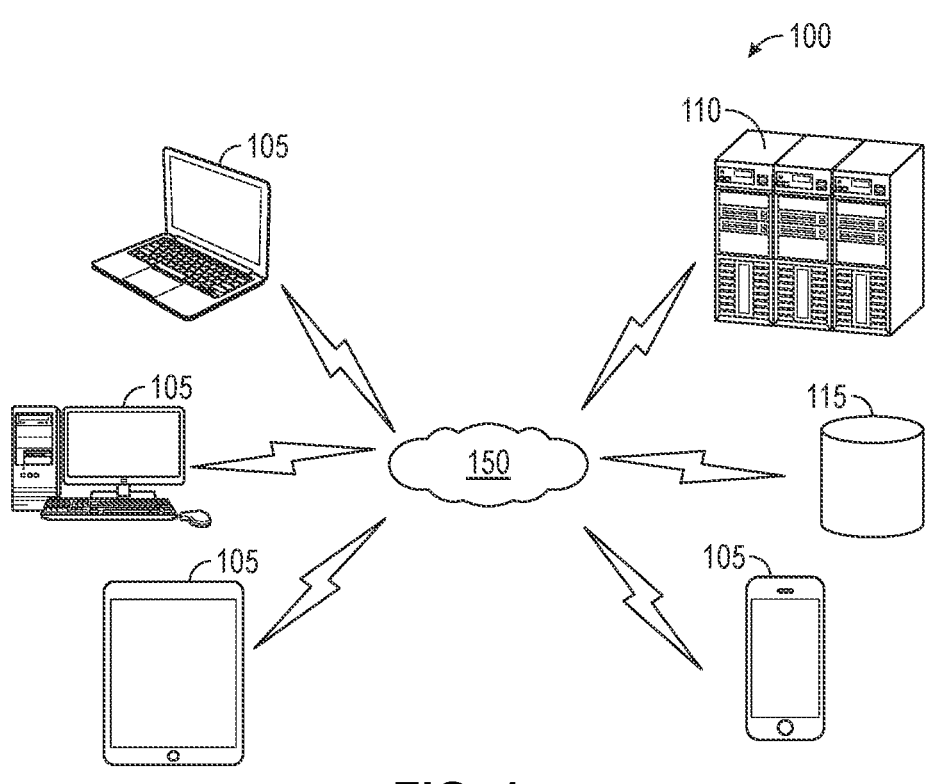
FIG. 1 illustrates a system embodying features consistent with the principles of the present disclosure.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a streaming device, a "smart" television, a personal digital assistant (PDA), a laptop, a smart phone, a tablet computer, or another type of computation or communication interface 280. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for instance, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document. Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for instance, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis.

Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
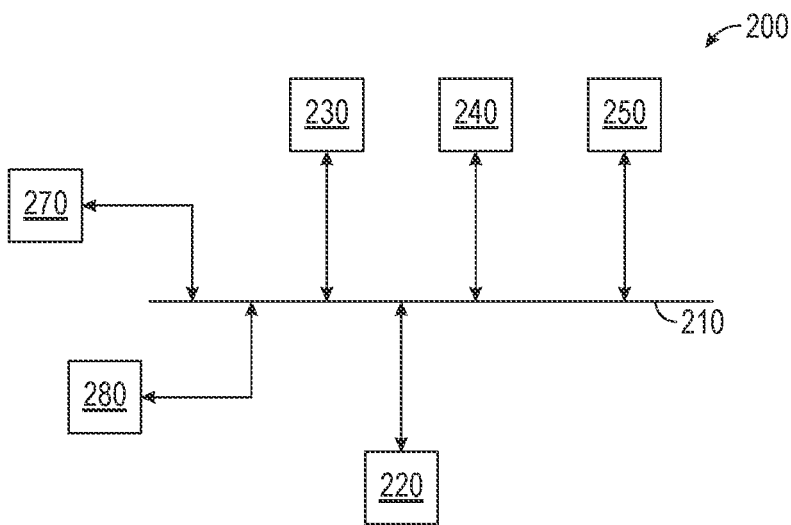
FIG. 2 illustrates a system embodying features consistent with the principles of the present disclosure.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280 (such as wired or wireless communication device). The bus 210 may be defined as one or more conductors that permit communication among the components of the computing entity 200. The processor 220 may be defined as logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of unit data from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 400. The processor 220 may process instructions for execution within the computing entity 200, including instructions stored in memory 304 or on a storage device 250, to display graphical information for a graphical user interface (GUI) on an external peripheral device 270, such as a display 316. The processor 220 may provide for coordination of the other components of a computing entity 200, such as control of user interfaces 411, applications run by a computing entity 200, and wireless communication by a communication interface 280 of the computing entity 200. The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers 110, mainframes, cellular telephones, tablet computers, smart televisions, streaming devices, smart watches, or any other similar device. Accordingly, the inventive subject matter disclosed herein, in full or in part, may be implemented or utilized in devices including, but are not limited to, laptops, desktops, workstations, personal digital assistants, servers 110, mainframes, cellular telephones, tablet computers, smart televisions, streaming devices, or any other similar device.

Memory 304 stores information within the computing device 300. In some preferred embodiments, memory 304 may include one or more volatile memory units. In another preferred embodiment, memory 304 may include one or more non-volatile memory units. Memory 304 may also include another form of computer-readable medium, such as a magnetic, solid state, or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device and/or an output device. As used herein, an input device may be defined as a device that allows a user 405 to unit data and instructions that is then converted into a pattern of electrical signals in binary code that are comprehensible to a computing entity 200. An input device of the peripheral device 270 may include one or more conventional devices that permit a user 405 to input information into the computing entity 200, such as a controller, scanner, phone, camera, scanning device, keyboard, a mouse, a pen, voice recognition and/or biometric mechanisms, etc. As used herein, an output device may be defined as a device that translates the electronic signals received from a computing entity 200 into a form intelligible to the user 405. An output device of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a streaming device may transfer data to a smartphone, wherein the smartphone may use that data in a manner separate from the streaming device.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
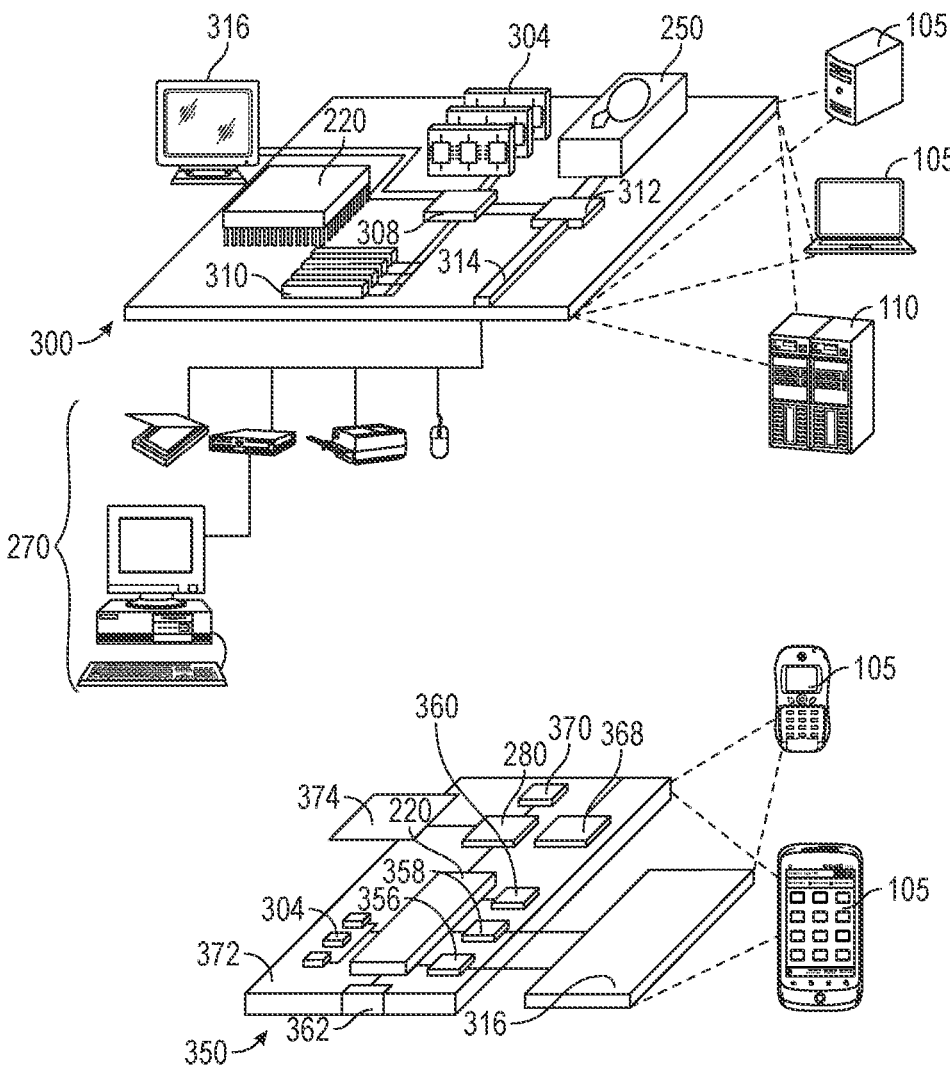
FIG. 3 illustrates a system embodying features consistent with the principles of the present disclosure.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers 110, databases 115, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304, a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device, such as a display 316 coupled to the high-speed interface 308. In other implementations, multiple processors and/or multiple buses may be used, as appropriate, along with multiple memory units and/or multiple types of memory. Additionally, multiple computing devices may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For instance, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 411, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), holographic displays, augmented reality displays, virtual reality displays, or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module 428 for a mobile computing device 350, wherein the security module 428 may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The power supply may be any source of power that provides the system 400 with electricity. In a preferred embodiment, the primary power source of the system is a stationary power source, such as a standard wall outlet. In one preferred embodiment, the system 400 may comprise of multiple power supplies that may provide power to the system 400 in different circumstances. For instance, the system 400 may be connected to a backup battery system, which may provide power to the system 400 when it's primary power source cannot provide power and so long as the batteries of the backup battery system are charged. In this way, the system 400 may receive power even in conditions in which traditional power sources are not working, allowing users to continue to use the system so that said system may review unit data to prevent sensitive data breaches.

Figure 4:
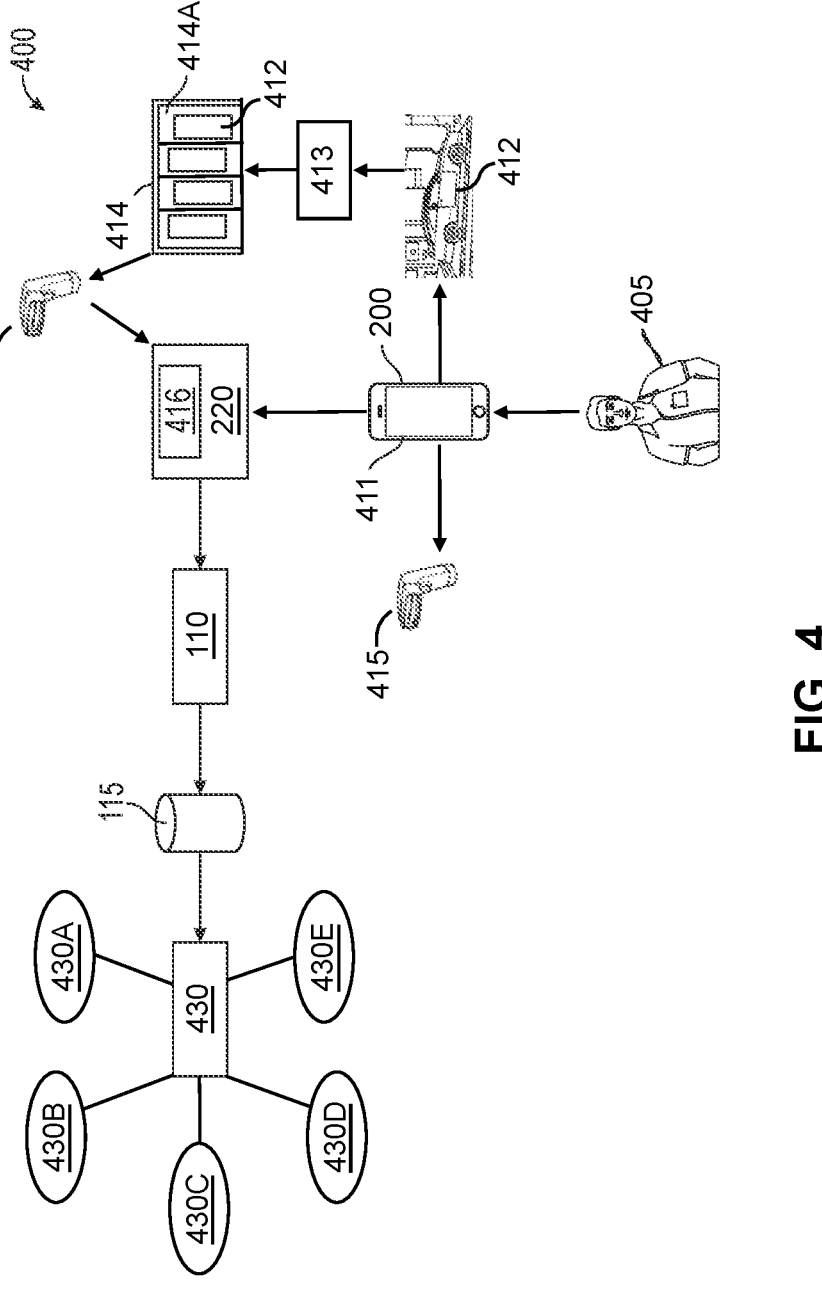
FIG. 4 illustrates a system for managing parking areas of a rental complex embodying features consistent with the principles of the present disclosure.
Figure 8:
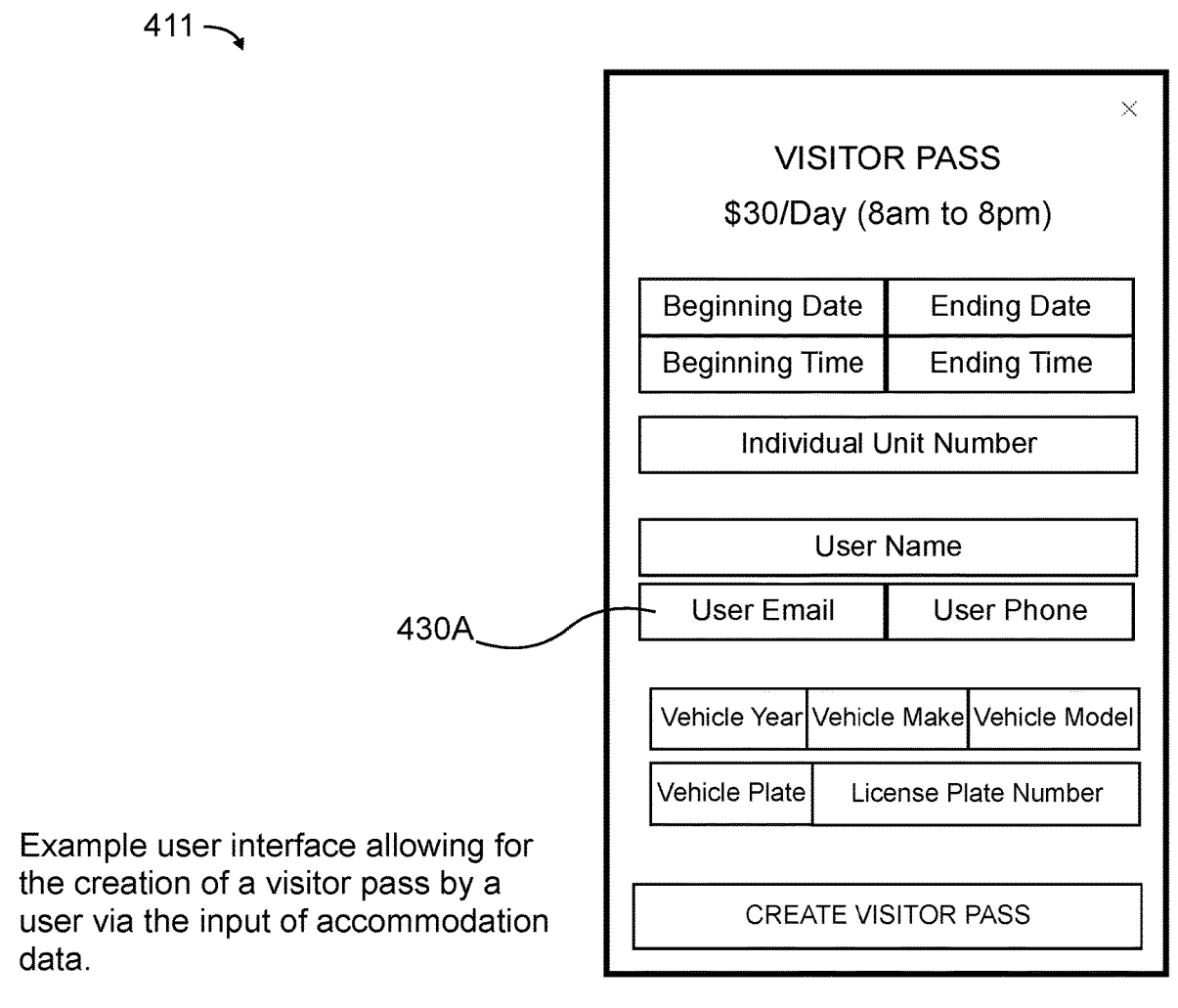
FIG. 8 illustrates a user interface of a system for managing parking areas of a rental complex and embodying features consistent with the principles of the present disclosure.
Figure 9:
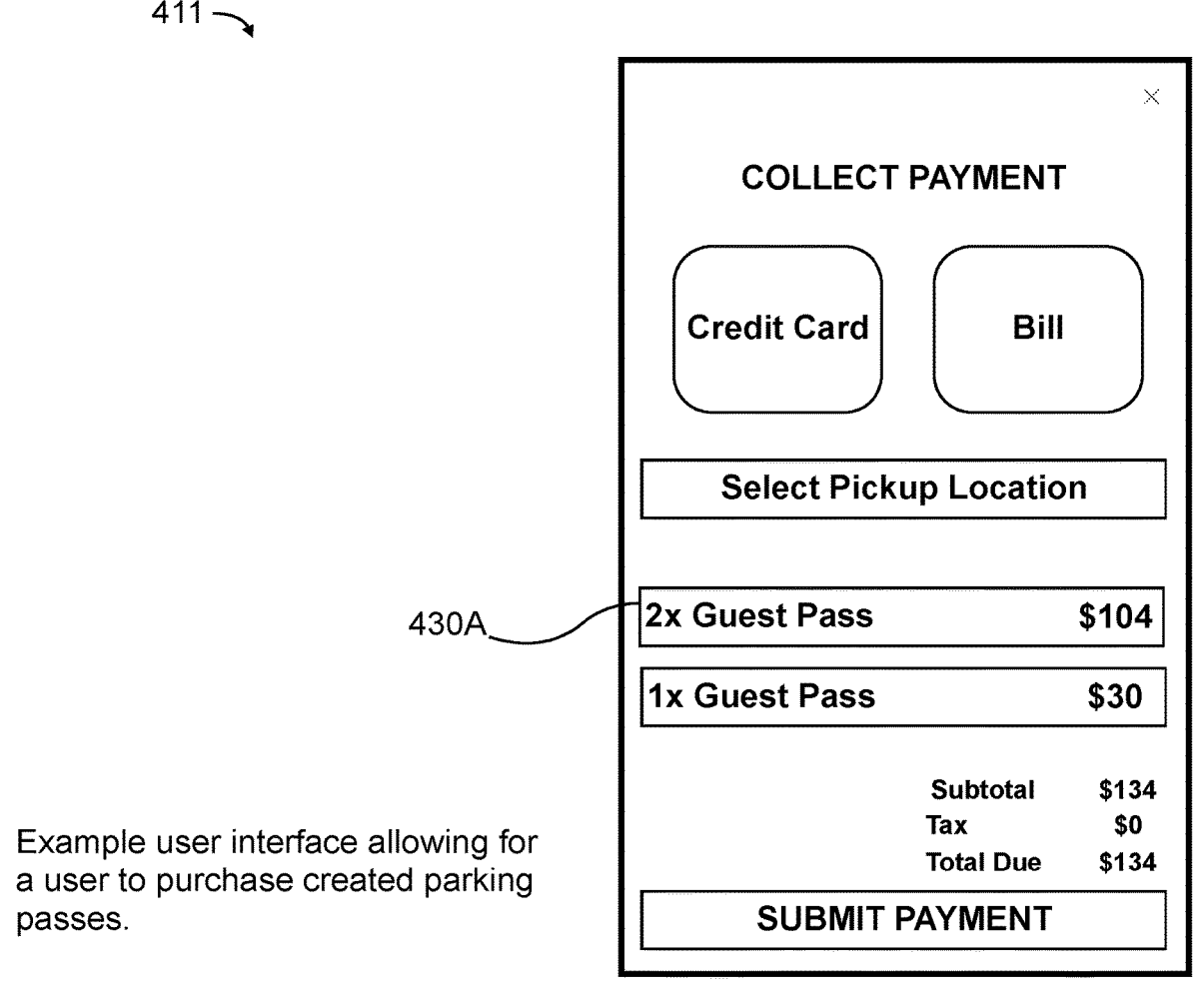
FIG. 9 illustrates a user interface of a system for managing parking areas of a rental complex and embodying features consistent with the principles of the present disclosure.
Figure 10:
FIG. 10 illustrates a parking pass embodying features consistent with the principles of the present disclosure.
Figure 11:
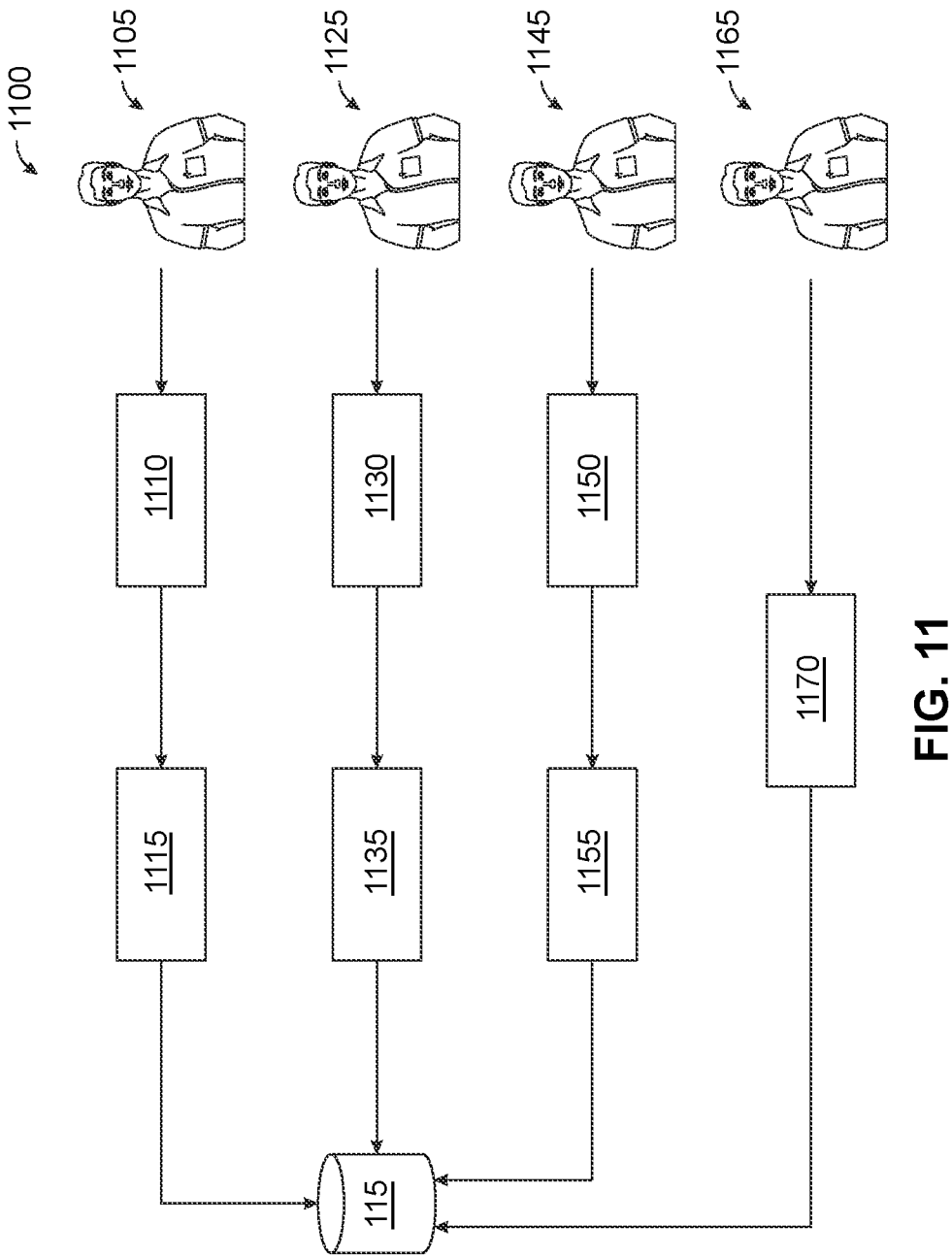
FIG. 11 is a diagram illustrating the manner in which individual access to data may be granted or limited based on user roles and administrator roles.

FIGS. 4-15 illustrate embodiments of a system 400 and methods for managing parking areas 414 of a rental complex. FIG. 4 illustrates a preferred embodiment of the system 400 configured to manage a parking area 414 of a rental complex, wherein said rental complex has a plurality of individual units associated with parking spaces 414A of said parking area 414. The system 400 generally comprises a computing entity 200 having a user interface 411, processor 220 operably connected to said computing entity 200, and CRM 416 coupled to said processor 220 and having instructions stored thereon. It is understood by one with skill in the art that the term computing entity 200 may be used to indicate a single computing entity 200 or multiple computing entities that may host the various features of the system 400. In one preferred embodiment, a database 115 may be operably connected to the processor 220, and the various data of the system 400 may be stored therein, including, but not limited to, accommodation data 430A, violation data 430B, projection data 430C, threshold limit data 430D, and rules and regulations data 430E. In a preferred embodiment, the various data of the system 400 transferred between the computing entities is encrypted. Other embodiments may further comprise a server 110 operably connected to the processor 220 and database 115, facilitating the transfer of data therebetween. In another preferred embodiment, a wireless communication interface may allow the various pieces of the system 400 to receive and transmit the various data therebetween. FIGS. 5-9 illustrate examples of the user interface 411 that may be used by users 405 of the system 400 to manage parking areas 414 of a rental complex. FIG. 10 illustrates an examples parking pass comprising multiple unique patterns. FIG. 11 illustrates permission levels that may be utilized by the system 400 for controlling access to the various data of the system 400. FIGS. 12-15 illustrate methods that may be used by users 405 of the system 400 to manage parking areas 414 of a rental complex. It is understood that the various method steps associated with the methods of the present disclosure may be carried out as operations by the system 400 shown in FIG. 4.

Generally, users 405 may operate the user interface 411 of the system 400 to manage a parking area 414 of a rental complex, wherein the parking area 414 has a plurality of parking spaces 414A that are associated with a plurality of individual units of the rental complex, wherein each individual unit of the plurality of individual units is associated with at least one parking space 414A of the parking area 414. A parking space 414A may have a specific location within a parking area 414 or generally refer to one parking space 414A of the plurality of parking spaces 414A within the parking area 414. Projection data 430C, threshold limit data 430D, and rules and regulations data 430E of the system 400 dictate a maximum number and minimum number of parking spaces 414A a user 405 may be allocated during a given accommodation at a rental complex. The system 400 may also be used by a user 405 to release parking spaces 414A associated with the individual unit in which they are staying back to the system 400, which may affect the number of parking spaces 414A other users 405 of the system 400 may reserve. In some preferred embodiments, the system 400 may estimate parking demand during a given period of time and limit a maximum number of rentable parking spaces 414A offered to a user 405. Projection data 430C may also be used estimate the minimum amount of staffing required for a rental complex based on the amount of residential overturn as determined by the amount of new parking passes 413 created using the system 400. In another preferred embodiment, the system 400 may actively monitor a parking area 414 for parking violations via the use of parking passes 413 and scanning devices 415. In yet another preferred embodiment, the system 400 may be configured to send alerts to rental complex security and/or security service providers should an unauthorized vehicle 412 be parked in the parking area 414.

As previously mentioned, the processor 220 is configured to perform the operations disclosed herein based on instructions stored within the system 400. In an embodiment, the programming instructions responsible for the operations carried out by the processor 220 are stored on a non-transitory computer-readable medium ("CRM") 416, which may be coupled to the server 110, as illustrated in FIG. 4. Alternatively, the programming instructions may be stored or included within the processor 220. Examples of CRMs 416 include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the CRM 416.

Data within the system 400 may be stored in various profiles. In a preferred embodiment, the system 400 comprises accommodation data 430A, violation data 430B, projection data 430C, threshold limit data 430D, and rules and regulations data 430E that may be stored in user profiles 430. A user profile 430 may be defined as a profile containing data about a particular user 405. As used herein, accommodation data 430A may be defined information pertaining to living accommodation of a user 405, and it may include personal data and unit data. Personal data is information that helps the system 400 identify the identity of the user 405. Types of data that may be used by the system 400 as personal data includes, but is not limited to, a user's name, username, social security number, phone number, gender, age, address, phone number, email address, license number, license plate number, vehicle identification number, vehicle make, vehicle model, vehicle year, vehicle color, accommodation ID number, owner ID number, vender ID number, or any combination thereof. In some preferred embodiments, the personal data may also include authentication and security data, such as passwords and security questions. As used herein, unit data is data that associated with an individual unit of a rental complex. Types of data that may be used by the system 400 as unit data includes, but is not limited to, image data, square footage, bedroom total, bathrooms total, unit description, unit location, minimum number of rentable parking spaces 414A, or any combination thereof. Image data may include a single image or a series of images ordered in a way that creates a video, which may or may not further include audio data.

As used herein, violation data 430B is data pertaining to a vehicle 412 in violation of rules and regulations data 430E of the system 400. Types of data that may be used by the system 400 as violation data 430B may include, but is not limited to, violated rule/regulation, personal data, and geolocation data. As used herein, projection data 430C is data that estimates parking load in a parking area 414 of a rental complex on a specific date or for a range of dates. In a preferred embodiment, projection data 430C estimates parking load using accommodation data 430A. The projection data 430C may indicate parking load for a date or range of dates in a number of different ways, including, but not limited to, a total number of potential reserved parking spaces 414A, total number of potential unreserved parking spaces 414A, percentage of total parking that has been reserved, percentage of total parking that has not been reserved, or any combination thereof. As used herein, threshold limit data 430D contains a plurality of threshold limits represents a quantitative threshold corresponding to the minimum and maximum amount of parking spaces 414A a user 405 can reserve based on rules and regulation and/or parking load. Threshold data may include threshold limits corresponding to the number of guest passes, visitor passes, owner passes, vendor passes, and employee passes allowed on a given date. In some preferred embodiments, threshold limits stored within the system 400 are part of unit data for a specific unit. In other preferred embodiments, threshold limits may apply to an entire parking area 414 of a rental complex at a given time. As used herein, rules and regulation data 430E is data pertaining to rules and regulation related to a parking area 414 of a rental complex. In one preferred embodiment, rules and regulations data 430E relate to guidelines created by owners of a rental complex to maintain order within a parking area 414. In another preferred embodiment, rules and regulations data 430E may include state and/or federal laws that pertain to parking areas 414.

Accommodation data 430A, violation data 430B, projection data 430C, threshold limit data 430D, and rules and regulations data 430E in combination with permission levels 1100 are preferably used by the system 400 to assist with the management of parking areas 414 and the number of parking spaces 414A that users 405 of the system 400 may reserve. A user 405 is preferably associated with a particular user profile 430 of the system 400 based on a username. However, it is understood that a user 405 may be associated with a user profile 430 using a variety of methods without departing from the inventive subject matter herein.

In some preferred embodiments, the system 400 may separate user profiles 430 into groups and subgroups (or user roles). In a preferred embodiment, various groups and subgroups of the system 400 may grant permission levels 1100 that give users 405 access to certain data within the system 400 but necessarily all data of the system 400. For instance, the user profile 430 of an employee acting as a building manager may be granted permission levels 1100 that allow the building manager to manage the entire parking area 414 of a condominium complex. For instance, the user profile 430 of an HOA board member may be granted permission levels 1100 that allow the HOA board member to change rules and regulation data that may affect the way the system 400 preauthorizes parking spaces 414A within a parking area 414. For instance, the user profile 430 of a rental property management firm may be granted permission levels 1100 that allow the rental property management firm to create a custom rigid threshold limit for each individual unit of the plurality of individual units at each rental complex in which the rental property management firm manages an individual unit, wherein the custom rigid threshold limit cannot exceed the rigid threshold limit associated with the unit. For instance, a user profile 430 of a sub-user of said rental property management firm may be granted permission levels 1100 that grant the sub-user the ability to manage parking spaces 414A for individual units at specific rental complexes. As such, users 405 of the system 400 may manage various aspects of parking spaces 414A associated with individual units depending on permission levels 1100 of the various users and sub-users.

As illustrated in FIG. 4, the system 400 may comprise a database 115 operably connected to the processor 220. The database 115 may be operably connected to the processor 220 via wired or wireless connection. In a preferred embodiment, the database 115 is configured to store accommodation data 430A, violation data 430B, projection data 430C, threshold limit data 430D, and rules and regulations data 430E therein. Alternatively, the accommodation data 430A, violation data 430B, projection data 430C, threshold limit data 430D, and rules and regulations data 430E may be stored on the CRM 416. The database 115 may be a relational database such that the accommodation data 430A, violation data 430B, projection data 430C, threshold limit data 430D, and rules and regulations data 430E associated with each user profile 430 within the plurality of user profiles 430 may be stored, at least in part, in one or more tables. Alternatively, the database 115 may be an object database such that accommodation data 430A, violation data 430B, projection data 430C, threshold limit data 430D, and rules and regulations data 430E associated with each user profile 430 within the plurality of user profiles 430 may be stored, at least in part, as objects. In some instances, the database 115 may comprise a relational and/or object database and a server 110 dedicated solely to managing the accommodation data 430A, violation data 430B, projection data 430C, threshold limit data 430D, and rules and regulations data 430E in the manners disclosed herein.

Information presented via a display 316 may be referred to as a soft copy of the information because the information exists electronically and is presented for a temporary period of time. Information stored on the CRM 416 may be referred to as the hard copy of the information. For instance, a display 316 may present a soft copy of a visual representation of image data via a liquid crystal display (LCD), wherein the hard copy of the image data may be stored on a local hard drive. For instance, a display 316 may present a soft copy of audio information via a speaker, wherein the hard copy of the audio information is stored in memory of a mobile computing device 350. For instance, a display 316 may present a soft copy of accommodation data 430A via a user interface 411, wherein the hard copy of the accommodation data 430A is stored within a database 115. Displays 316 may include, but are not limited to, cathode ray tube monitors, LCD monitors, light emitting diode (LED) monitors, gas plasma monitors, holographic displays, augmented reality displays, virtual reality displays, screen readers, speech synthesizers, holographic displays, speakers, and scent generating devices, or any combination thereof, but is not limited to these devices.

A user interface 411 may be defined as a space where interactions between a user 405 and the system 400 may take place. In an embodiment, the interactions may take place in a way such that a user 405 may control the operations of the system 400. A user interface 411 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, brain-computer interfaces (BCIs), and graphical user interfaces, or any combination thereof. The system 400 may present data of the user interface 411 to the user 405 via a display 316 operably connected to the processor 220. A display 316 may be defined as an output device that communicates data that may include, but is not limited to, visual, auditory, cutaneous, kinesthetic, olfactory, and gustatory, or any combination thereof. The computing entities themselves may further comprise a display 316.

In a preferred embodiment, the system 400 determines if a violation of rules and regulations data 430E has occurred by comparing accommodation data 430A of a parking pass 413 to at least one of a date and vehicle attributes. Vehicle attributes may be defined as the physical attributes of the vehicle 412 on which the parking pass 413 is secured. Accommodation data 430A of the parking pass 413 preferably contains an accommodation date and personal data pertaining to a particular vehicle 412 of a user 405. If the accommodation date is outside of the current date and/or personal data pertaining to a particular vehicle 412 of a user 405 does not match the vehicle attributes of the vehicle 412 to which the parking pass 413 is secured, a parking violation will have occurred. Because the system 400 limits parking passes 413 for guests, visitors, owners, vendors, and employees bases on rules and regulations data 430E and/or load capacity, a parking violation means that there has been a violation of the rules and regulations data 430E and or load capacity rules of the system 400. This places the parking area 414 of a rental complex at going beyond max capacity. Accordingly, for the system 400 to fully manage the parking area 414 of a rental complex it must also be able to recognize when a parking violation has occurred. Further, the system 400 may be able to alert users 405 of the system 400 when a violation has occurred.

In a preferred embodiment, the system 400 generates parking passes 413 using accommodation data 430A entered into the user interface 411 by a user 405. Parking passes 413 created by the system 400 may be scanned by a scanning device 415, which may then cause the accommodation data 430A associated with the parking pass 413 to be sent to a processor 220 so that the processor 220 may determine if a rule or regulation has been violated. This functionality works in conjunction with the preauthorization functionality to prevent a parking area 414 of a rental complex from reaching a parking load that is greater than maximum capacity. In a preferred embodiment, parking passes 413 are meant to be displayed on or about a vehicle 412. When a parking pass 413 is generated by the system 400, it preferably includes one or more unique patterns, wherein scanning a unique pattern with a scanning device 415 of the system 400 causes accommodation data 430A associated with the unique pattern to be displayed on one or more computing entities of the system 400, allowing for a user 405 to confirm that a vehicle 412 is authorized to be parked in the parking area 414 of a rental complex. In another preferred embodiment, the accommodation data 430A displayed may include, but is not limited to, vehicle make, vehicle model, vehicle year, vehicle color, license plate number, guest name, guest email, guest phone number, reservation number, check-in date, check-out date, or any combination thereof. In a preferred embodiment, as illustrated in FIG. 10, the unique patterns of the parking pass 413 include a QR code, pass ID number, accommodation confirmation number, and license plate number. Other unique patterns that may be used to create parking passes 413 include, but are not limited to, barcodes, Aztec codes, data matrix, maxi codes, or any combination thereof.

In another preferred embodiment, the parking pass 413 may comprise a communication interface that allows for the wireless communication of accommodation data 430A to the scanning device 415. The communication interface is preferably operably connected to a memory unit containing the accommodation data 430A, wherein antennas of the wireless communication interface emit radio waves that the scanning device 415 is configured to receive and interpret. For instance, a parking pass 413 comprising a radio frequency identification (RFID) tag may be secured to the window of a vehicle 412. A scanning device 415 may be used to read the RFID tag in a way that causes accommodation data 430A stored on the RFID tag to be sent to the scanning device 415. In some embodiments, the scanning device 415 may be configured to read communication interfaces of digital license plates. This might allow for a user 405 to collect various types of data pertaining to a vehicle 412 and an accommodation automatically to determine the if a vehicle 412 has been preauthorized for a parking space 414A of a parking area 414 prior to entering the parking area 414. For instance, an entrance of a parking area 414 may have various scanning devices 415 configured to collect accommodation data 430A and other data of a vehicle as a vehicle 412 passes by the scanning devices 415. This data may be sent to a processor 220 where it may be analyzed to determine if a parking violation has occurred. Types of devices that may act as the communication interface include, but are not limited, to near field communication (NFC), Bluetooth, infrared (IR), radio-frequency communication (RFC), radio-frequency identification (RFID), and ANT+, or any combination thereof. In an embodiment, communication interfaces may broadcast signals of more than one type. For instance, a communication interface comprising an IR transmitter and RFID transmitter may broadcast IR signals and RFID signals. Alternatively, a communication interface may broadcast signals of only one type of signal. For instance, digital license plates may be fitted with a communication interface that broadcast only IR signals containing registration information that the system 400 may then use to actively monitor a parking area 414.

In one preferred embodiment, a single scanning device 415 may be configured to scan the parking pass 413 and a license plate of the vehicle 412 on which the parking pass 413 is secured. When the user 405 scans the parking pass 413 using the scanning device 415, a user interface 411 of a computing entity 200 may request that the user 405 scan a license plate of the associated vehicle 412. The user 405 may then use the scanning device 415 to scan the license plate and transmit the resulting data (preferably image data) to the processor 220, which may allow the processor 220 to perform additional functions that may assist with detecting violations of rules and regulations data 430E. Alternatively, the scanning device 415 may be configured to first scan the license plate of a vehicle 412 before requesting that the user 405 scan the parking pass 413 associated with the vehicle 412. In another preferred embodiment, the scanning device 415 may be configured to take capture image data of a vehicle 412 and transmit said image to the processor 220 of a computing entity 200 having vehicle recognition software. The vehicle recognition software may then analyze the image data for the vehicle make, vehicle model, vehicle year, and vehicle color. Once determined, the processor 220 may perform a check to confirm that the vehicle make, vehicle model, vehicle year, and vehicle color match the accommodation data 430A associated with the parking pass 413. Accordingly, a single scanning device 415 may be used in multiple ways to confirm that only a vehicle 412 associated with an individual unit via a parking pass 413 may use the parking area 414 of a rental complex.

In another preferred embodiment, the system 400 may comprise more than one scanning device 415. In a preferred embodiment, a first scanning device 415 is used to scan the parking pass 413 associated with the vehicle 412 whereas the second computing entity 200 is configured to scan the license plate of the vehicle 412. In a preferred embodiment, the first scanning device 415 is part of a mobile computing entity 200 that is operated by a user 405 whereas the second scanning device 415 is a license plate scanner configured to generally remain in one place and monitor license plates of vehicles 412. A processor 220 connected to the first computing entity 200 and second computing entity 200 may analyze data collected to determine if a vehicle 412 is authorized to park in a parking space 414A of a parking area 414 of a rental complex. In yet another preferred embodiment, the system 400 may further comprise an automatic gate operably connected to the processor 220. Should the accommodation data 430A provided by the parking pass 413 match the data provided by the license plate reader, the processor 220 may send a computer readable signal that causes the gate to open so that the vehicle 412 may move into the parking area 414 in which it is authorized.

In another preferred embodiment, the second scanning device 415 may be configured to provide image data of a parking area 414 and/or entrance to a parking area 414. When a first scanning device 415 receives accommodation data 430A from a parking pass 413 associated with a vehicle 412, the processor 220 may access image data provided by the second scanning device 415 to determine which vehicle 412 was scanned by the first scanning. The processor 220 may then use vehicle recognition software and confirm that the vehicle make, vehicle model, vehicle year, and/or vehicle color match the accommodation data 430A associated with the parking pass 413. In some preferred embodiments, the processor 220 may extract a license plate number of the vehicles 412 within the image data. Once the scanning device 415(s) has/have obtained the relevant information, the processor 220 may perform an analysis to determine if a vehicle 412 is authorized or not authorized to use a parking area 414 of a rental complex and alert relevant users 405 of the system 400 if necessary.

In a preferred embodiment, when the processor 220 determines that a parking violation has occurred, it may send a computer readable signal to a computing entity 200 that causes indicia 605 to alert the user 405 of a parking violation. In a preferred embodiment, the processor 220 causes a visual indicium 605 to manifest within the user interface 411 of a computing entity 200 of the system 400. For instance, a user 405 operating a mobile computing entity 200 having a scanning device 415 and operably connected to the processor 220 may receive a computer readable signal from the processor 220 that causes the computing entity 200 to present an indicium 605 within the user interface 411 that alerts the user 405 that a vehicle 412 is in violation of rules and regulations data 430E of the system 400. For instance, a computing entity 200 of a check-in area of a rental complex may receive a computer readable signal from the processor 220, alerting a user 405 using the computing entity 200 that a possible parking violation has occurred.

In a preferred embodiment, when a violation of a rule or regulation has been determined by the system 400, violation data 430B may be generated by the system 400, wherein the violation data 430B may contain information pertaining to the offending vehicle 412 as well as geolocation data and how said vehicle 412 violates said rules and regulations data 430E. For instance, a user 405 scanning parking passes 413 secured to vehicles 412 and license plates of said vehicles 412 may be alerted via a computing entity 200 secured to scanning device 415 that a parking pass 413 has expired due to the accommodation ending on a previous date. The user 405 may then enter input data into the computing entity 200 that describes the vehicle attributes of the vehicle 412, including, but not limited to, vehicle make, vehicle model, vehicle color, vehicle year, license plate number, or any combination thereof. Based on this input data and the violation determination, the system 400 may create violation data 430B. For instance, the system 400 may detect a vehicle 412 having a parking pass 413 associated with accommodation data 430A that differs from the vehicle attributes of said vehicle 412. This may cause the processor 220 to generate violation data 430B that contains information explaining that the vehicle 412 to which the parking pass 413 is secured does not match the accommodation data 430A within the parking pass 413. For instance, the system 400 may automatically generate violation data 430B using accommodation data 430A from the scanned parking pass 413 and image data, and geolocation data of the mobile computing device 350 secured to the scanning device 415 used to read the accommodation data 430A associated with the parking pass 413.

In a preferred embodiment, scanning devices 415 may comprise and/or be secured to a mobile computing device 350 comprising a geolocation positioning system (GPS), which may provide the processor 220 with geolocation data when a violation is detected. The GPS is configured to transmit geospatial data to the processor 220 in a way that allows the system 400 to determine the geolocation of the user 405. Alternatively, a user 405 may manually input geospatial data corresponding to a specific geolocation into the user interface 411 of the system 400. For instance, a system 400 comprising a mobile computing device 350 having a user interface 411 may allow a user 405 to input geospatial data using an input device such as a keyboard. For instance, a system 400 comprising a mobile computing device 350 having a touch screen and a user interface 411 comprising a graphic information system (GIS) may allow a user 405 to select the geolocation on a map displayed via the touchscreen. As used herein, geospatial data may be spatial data including, but not limited to, numeric data, vector data, and raster data, or any combination thereof. Numeric data may be statistical data which includes a geographical component or field that can be joined with vector files so the data may be queried and displayed as a layer on a map in a GIS. Vector data may be data that has a spatial component, or X, Y coordinates assigned to it. Vector data may contain sets of points, lines, or polygons that are referenced in a geographic space. Raster data may be data in a .JPG, .TIF, .GIF or other picture file format. For instance, a map scanned in a flatbed scanner may be considered raster data.

In some preferred embodiments, vendors may be able to create user profiles 430 using the system 400. The user profile 430 of a vendor user 405 may be granted permissions that allow access to violation data 430B. When a parking violation occurs and the processor 220 creates violation data 430B for said violation, the system 400 may be configured to send violation data 430B to vendors having the appropriate permissions. This may allow a vendor to locate the violating vehicle 412 and perform a service for the rental complex. In one preferred embodiment, a user interface 411 of a computing entity 200 of a vendor may be configured to receive a computer readable signal form the processor 220 that may cause the computing entity 200 to alert the vendor when a violation has occurred. In another preferred embodiment, the user interface 411 of a vendor's computing entity 200 may be configured to populate with information that will allow the vendor to identify an offending vehicle 412. For instance, when the system 400 determines that a violation has occurred, the processor 220 may send a computer readable signal containing violation data 430B to a vendor user. The computer readable signal may cause the computing entity 200 of the vendor to emit one or more indicium 605 that a parking violation has occurred. When the vendor user accesses the user interface 411 of the system 400, the user interface 411 may provide the vendor user with enough information that the vendor user may identify the violating vehicle 412. In some embodiments, a GIS of the user interface 411 may visualize the geolocation of the violating vehicle 412 for the vendor user. For instance, a third-party security monitoring company contracted by an HOA may be granted access to all violation data 430B of the system 400 so that they may send security to inquire about a potentially violating vehicle 412 when violation of rules and regulations data 430E is determined.

In a preferred embodiment, the system 400 may perform a regression analysis when determining whether a flexible threshold limit should be used for a maximum number of reservations for a user 405 instead of the rigid threshold limit. To make this determination, the processor 220 may perform one or more regression analyses using retrieved accommodation data 430A corresponding to guest passes, visitor passes, owner passes, vendor passes, employee passes as well as projection data 430C to determine how closely the projection data 430C matches upcoming accommodation data 430A. This may assist the system 400 with determining how many, if any, additional parking spots a user 405 may reserve over the rigid threshold limit. In some embodiments, the processor 220 may complete two regression analyses. In one such embodiment, a first regression analysis comparing projection data 430C to each upcoming accommodation as determined by the accommodation data 430A and a second regression analysis comparing all upcoming accommodations as determined by the accommodation data 430A to the projection data 430C may be carried out by the processor 220. In some embodiments, the first regression analysis may include comparing each type of parking pass 413 (guest passes, visitor passes, owner passes, vendor passes, and employee) to projection data 430C to determine if there will be enough parking passes 413 to allow a user 405 to reserve more parking passes 413 than the rigid threshold limit. The foregoing process may be repeated by the processor 220 for each user 405 who uses the system 400 to reserve parking passes 413.

In an embodiment, when projection data 430C indicates that parking load will be greater than a defined percentage and a regression analysis has a p-value less than 0.05 during the one or more regression analyses, the system 400 may cause the system 400 to use the rigid threshold limit. In another embodiment, the system 400 may automatically cause the system 400 to use the rigid threshold limit when projection data 430C indicates that parking load will be greater than a defined percentage regardless of any regression analysis. In an embodiment, when projection data 430C indicates that parking load will be less than a defined percentage and a regression analysis has a p-value less than 0.05 during the one or more regression analyses, the system 400 may cause the system 400 to use the flexible threshold limit. In another embodiment, the system 400 may automatically cause the system 400 to use the flexible threshold limit when projection data 430C indicates that parking load will be less than a defined percentage regardless of any regression analysis. In a preferred embodiment, the flexible threshold limit is a maximum of twice as large as the rigid threshold limit for an individual unit. At no point can the flexible threshold limit be greater than a maximum number of parking spots minus and total number of guest passes, visitor passes, owner passes, vendor passes, and employee passes.

In some preferred embodiments, the system 400 may use accommodation data 430A to determine the minimum number of employees needed to manage a rental complex. The system 400 may then use this data to determine the number of employee passes needed for a rental complex on a given date, which the system 400 may then use to subtract from a total number of reservable parking spaces 414A within a parking area 414 of a rental complex. Accordingly, in one preferred embodiment, employee parking passes 413 take precedence over guest passes and visitor passes. In another preferred embodiment, owner passes and vendor passes are immediately subtracted from a total number of reservable parking spots before a flexible threshold unit is calculated. In yet another preferred embodiment, guest passes are subtracted from a total number of reservable parking spots prior to the system 400 makes a determination as to whether to allow for the reservation of parking spaces 414A via guest passes. In some embodiments, different types of passes may have different thresholds for projection data 430C before a rigid threshold limit is used. In a preferred embodiment, the lowest rigid threshold limit for a visitor pass is zero. Accordingly, in some embodiments, the system 400 may not allow visitor passes to be purchased should the system 400 determine that parking load could be too great.

To prevent un-authorized users 405 from accessing other user's 405 information or changing data of the system 400, the system 400 may employ a security method. As illustrated in FIG. 11, the security method of the system 400 may comprise a plurality of permission levels 1100 that may grant users 405 access to user content 1115, 1135, 1155 within the database 115 while simultaneously denying users 405 without appropriate permission levels 1100 the ability to view user content 1115, 1135, 1155. To access the user content 1115, 1135, 1155 stored within the database 115, users 405 may be required to make a request via a user interface 411. Access to the data within the database 115 may be granted or denied by the processor 220 based on verification of a requesting user's 1105, 1125, 1145 permission level 1100. If the requesting user's 1105, 1125, 1145 permission level 1100 is sufficient, the processor 220 may provide the requesting user 1105, 1125, 1145 access to user content 1115, 1135, 1155 stored within the database 115. Conversely, if the requesting user's 1105, 1125, 1145 permission level 1100 is insufficient, the processor 220 may deny the requesting user 1105, 1125, 1145 access to user content 1115, 1135, 1155 stored within the database 115. In an embodiment, permission levels 1100 may be based on user roles 1110, 1130, 1150 and administrator roles 1170, as illustrated in FIG. 11. User roles 1110, 1130, 1150 allow requesting users 1105, 1125, 1145 to access user content 1115, 1135, 1155 that a user 405 has uploaded and/or otherwise obtained through use of the system 400. Administrator roles 1170 allow administrators 1165 to access system 400 wide data.

In an embodiment, user roles 1110, 1130, 1150 may be assigned to a user 405 in a way such that a requesting user 1105, 1125, 1145 may view user profiles 425 containing accommodation data 430A, violation data 430B, projection data 430C, threshold limit data 430D, and rules and regulations data 430E via a user interface 411. To access the data within the database 115, a user 405 may make a user request via the user interface 411 to the processor 220. In an embodiment, the processor 220 may grant or deny the request based on the permission level 1100 associated with the requesting user 1105, 1125, 1145. Only users 405 having appropriate user roles 1110, 1130, 1150 or administrator roles 1170 may access the data within the user profiles 425. For instance, as illustrated in FIG. 11, requesting user 1 1105 has permission to view user 1 content 1115 and user 2 content 1135 whereas requesting user 2 1125 only has permission to view user 2 content 1135. Alternatively, user content 1115, 1135, 1155 may be restricted in a way such that a user may only view a limited amount of user content 1115, 1135, 1155. For instance, requesting user 3 1145 may be granted a permission level 1100 that only allows them to view user 3 content 1155 related to personal data pertaining to vehicles 412 but not user 3 content 1155 related to personal data related to social security numbers. In the example illustrated in FIG. 11, an administrator 1165 may bestow a new permission level 1100 on users so that it may grant them greater permissions or lesser permissions. For instance, an administrator 1165 may bestow a greater permission level 1100 on other users so that they may view user 3's content 1155 and/or any other user's 405 content 1115, 1135, 1155. Therefore, the permission levels 1100 of the system 400 may be assigned to users 405 in various ways without departing from the inventive subject matter described herein.

Figure 5:
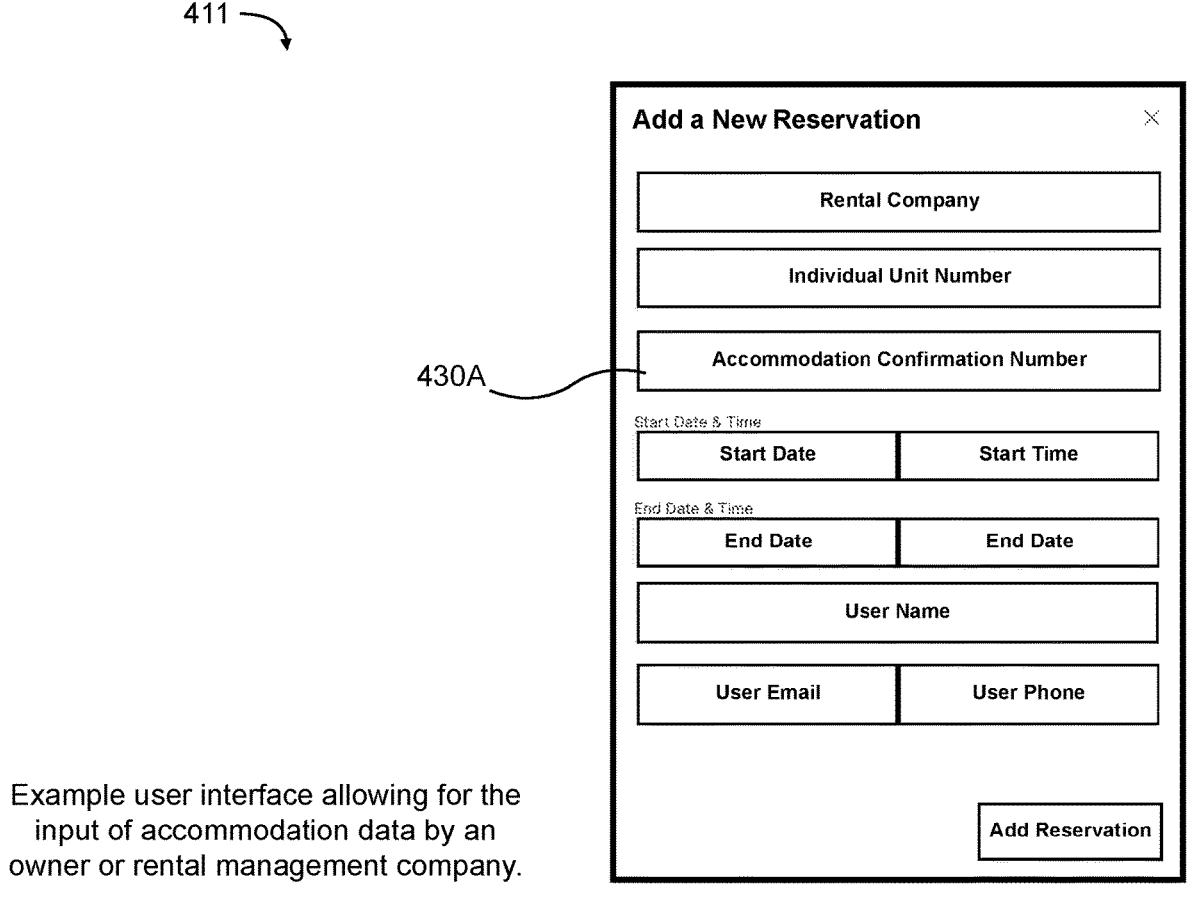
FIG. 5 illustrates a user interface of a system for managing parking areas of a rental complex and embodying features consistent with the principles of the present disclosure.
Figure 6:
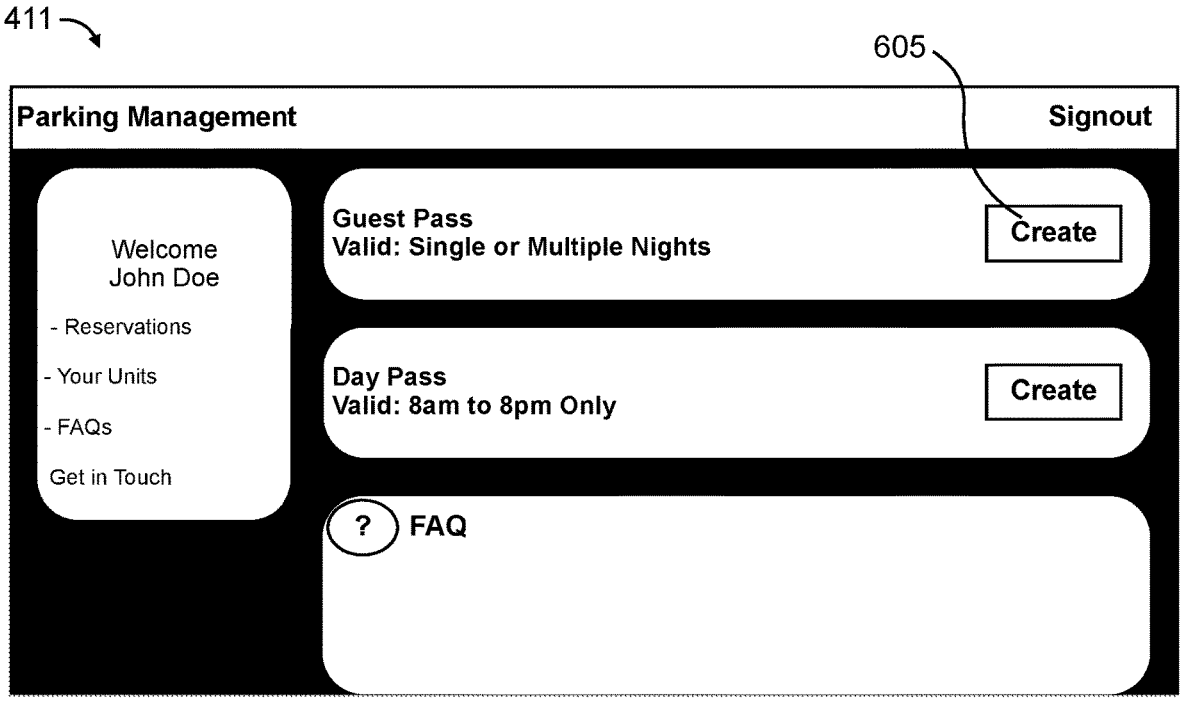
FIG. 6 illustrates a user interface of a system for managing parking areas of a rental complex and embodying features consistent with the principles of the present disclosure.
Figure 7:
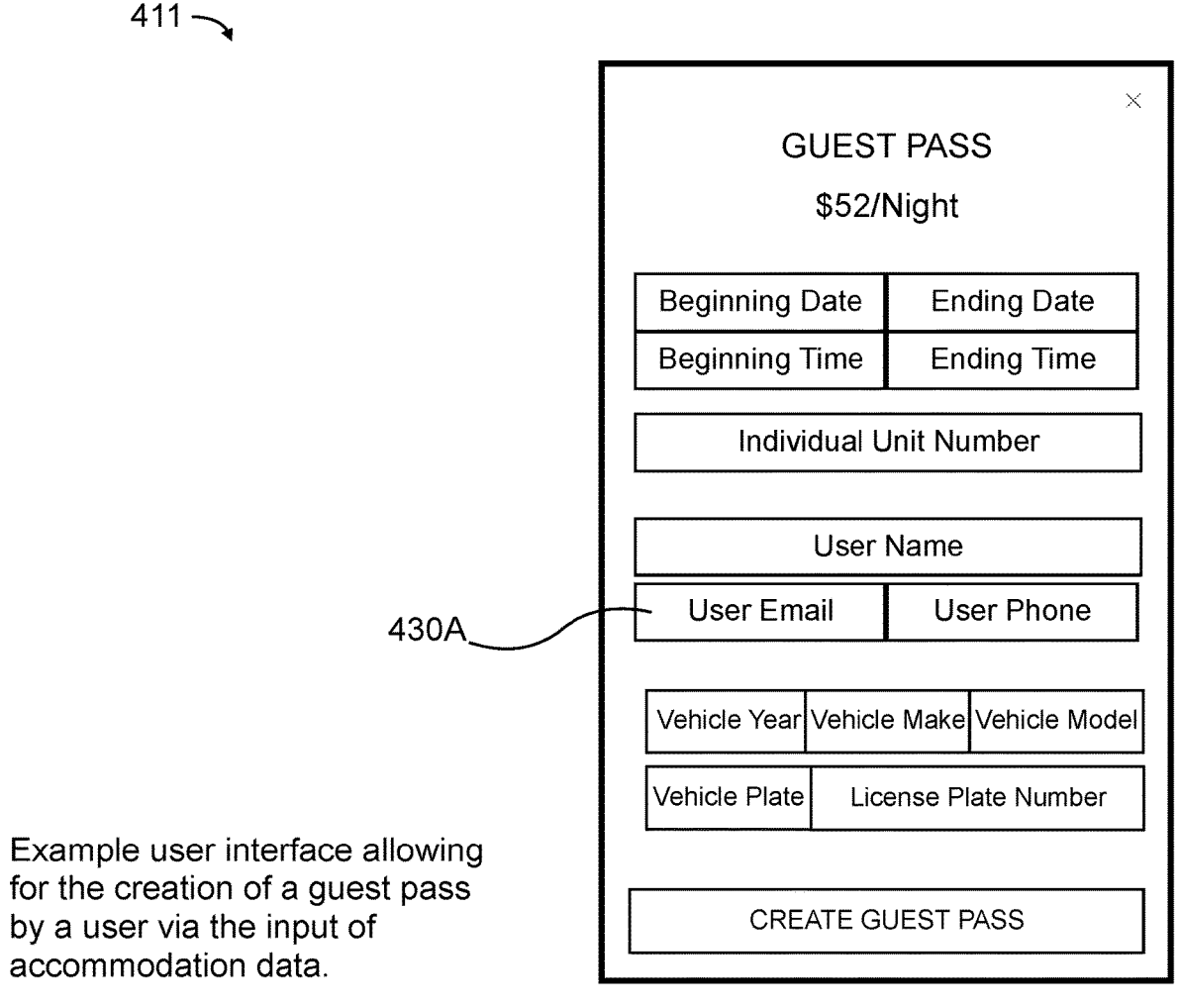
FIG. 7 illustrates a user interface of a system for managing parking areas of a rental complex and embodying features consistent with the principles of the present disclosure.
Figure 12:
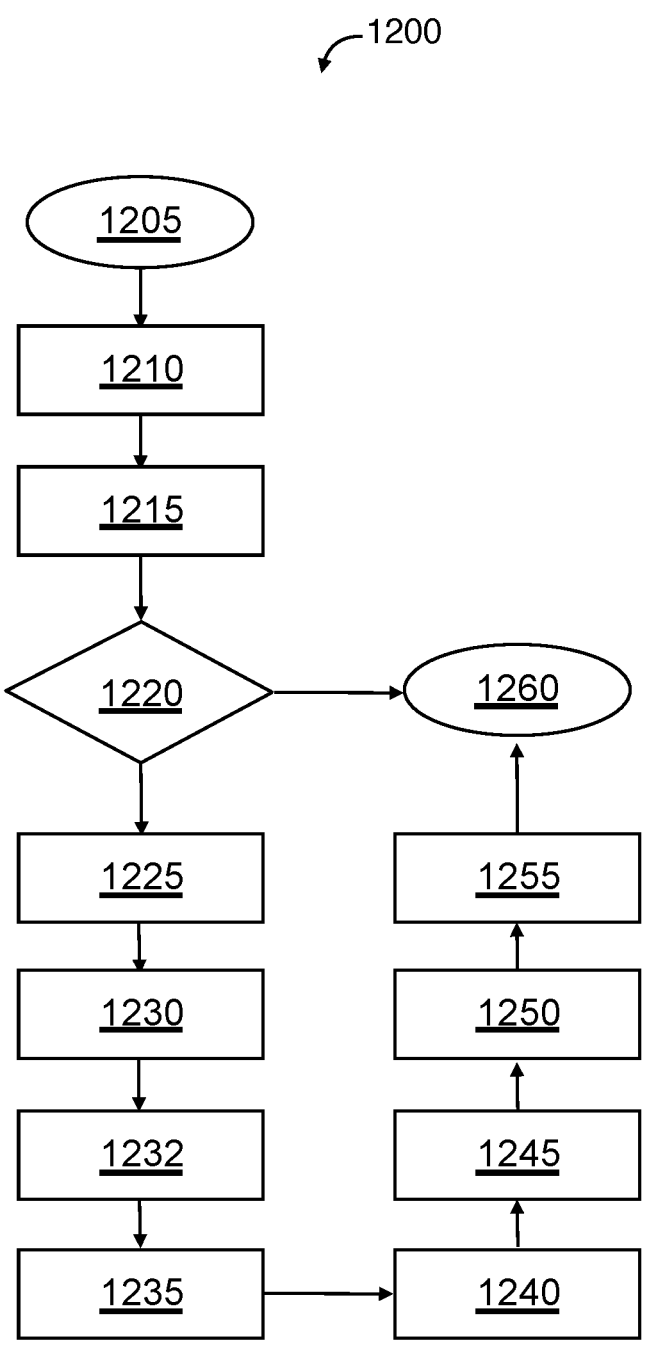
FIG. 12 is a flow chart illustrating certain method steps of a method embodying features consistent with the principles of the present disclosure.

FIG. 12 provides a flow chart 1200 illustrating certain, preferred method steps that may be used to carry out the method of creating a guest pass, as illustrated in FIGS. 6, 7, and 9. Step 1205 indicates the beginning of the method. During step 1210, the processor 220 may receive accommodation data 430A in the form of input data. During step 1215 the processor 220 may perform a query to determine if accommodation data 430A entered as input data matches accommodation data 430A of the system 400. In a preferred embodiment, accommodation data 430A is entered into the system 400 previously by a user 405 having appropriate permission levels 1100 via the user interface 411, as illustrated in FIG. 5. Based on the results of the query, the processor 220 may take an action during step 1220. If the accommodation data 430A entered as input data does not match accommodation data 430A of the system 400, the processor 220 may proceed to the terminate method step 1260. If the accommodation data 430A entered as input data does match accommodation data 430A of the system 400, the processor 220 may proceed step 1225 and present via the user interface 411 an indicium 605 that when selected will cause the system 400 to allow a user 405 to create a parking pass 413. During step 1230, the processor 220 may receive input data pertaining to the selection of said indicium 605 for creating a parking pass 413 and subsequently cause the user interface 411 to ask a user 405 to input accommodation data 430A pertaining to an individual unit during step 1232.

The system 400 may then perform a query during step 1235 to determine the total number of reservable parking spaces 414A the user 405 may reserve through the system 400, wherein the total number of reservable parking spaces 414A is related to threshold limits of the system 400. During step 1240, the processor 220 may cause the user interface 411 to ask the user 405 to choose a number of parking spaces 414A to reserve, wherein said number of parking spaces 414A to reserve can be no larger than the total number of reservable parking spaces 414A as determined by the system 400. The processor 220 may receive input data pertaining to the number of parking spaces 414A to reserve during step 1245 and subsequently ask a user 405 to enter input data pertaining to vehicle attributes of a vehicle 412 of the user 405 during step 1250. Once entered, the processor 220 may create a parking pass 413 using accommodation data 430A during step 1255, which may include vehicle attributes of the vehicle 412. The processor 220 may proceed to terminate method step 1260 once the parking pass 413 has been generated. In some preferred embodiments, the processor 220 may send the generated parking pass 413 to the user 405 prior to proceeding to terminate method step 1260.

Figure 13:
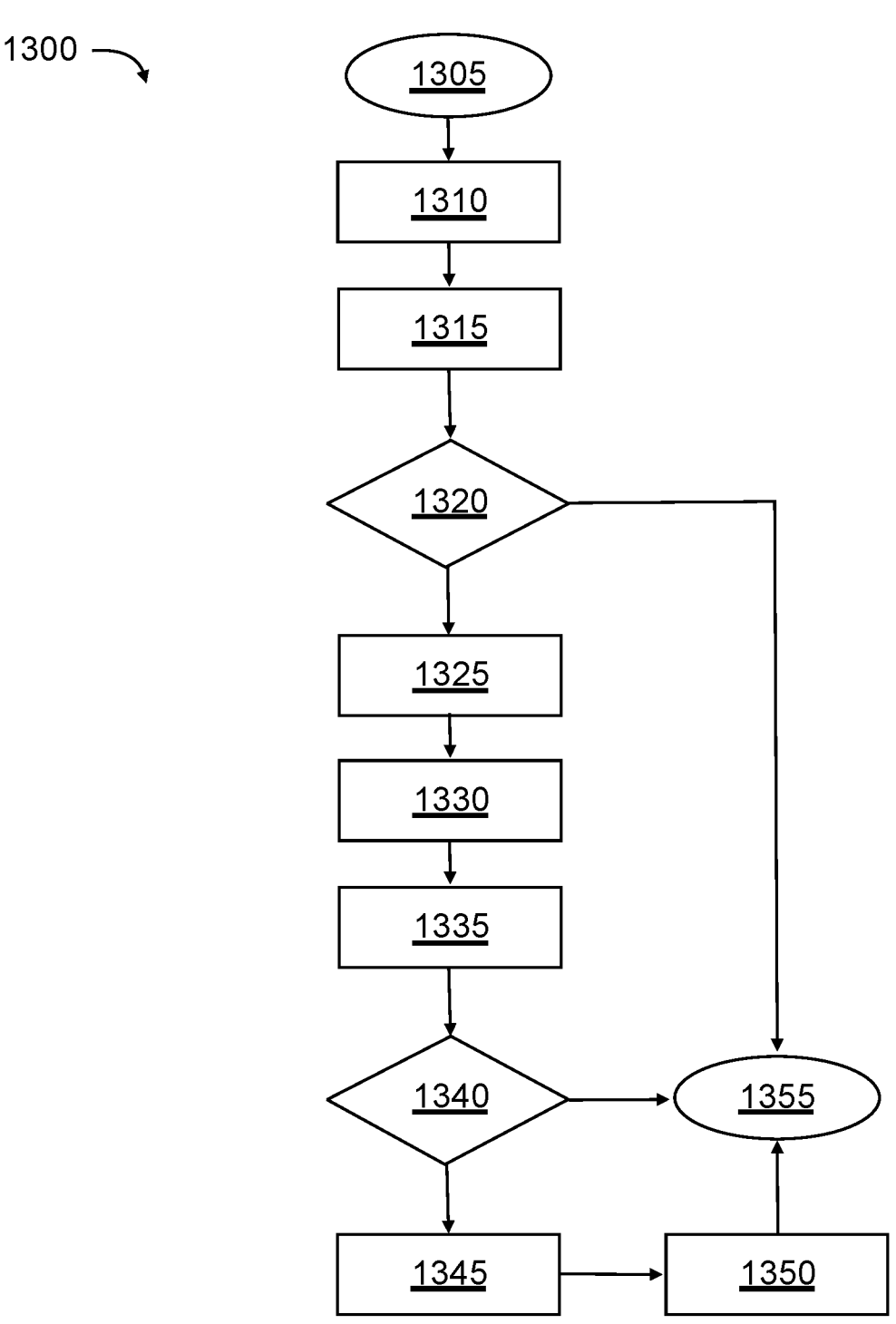
FIG. 13 is a flow chart illustrating certain method steps of a method embodying features consistent with the principles of the present disclosure.

FIG. 13 provides a flow chart 1300 illustrating certain, preferred method steps that may be used to carry out the method of creating a visitor pass, as illustrated in FIGS. 6, 8, and 9. Step 1305 indicates the beginning of the method. During step 1310, the processor 220 may receive accommodation data 430A in the form of input data pertaining to an individual unit of a rental complex. In a preferred embodiment, accommodation data 430A is entered into the system 400 previously by a user 405 having appropriate permission levels 1100 via the user interface 411, as illustrated in FIG. 5. During step 1315 the processor 220 may perform a query to determine if accommodation data 430A entered as input data matches accommodation data 430A of the system 400. Based on the results of the query, the processor 220 may take an action during step 1320. If the accommodation data 430A entered as input data does not match accommodation data 430A of the system 400, the processor 220 may proceed to the terminate method step

1355. If the accommodation data 430A entered as input data does match accommodation data 430A of the system 400, the processor 220 may proceed step 1325 and present via the user interface 411 an indicium 605 that when selected will cause the system 400 to allow a user 405 to create a visitor pass. During step 1330, the processor 220 may receive input data pertaining to the selection of said indicium 605 for creating a visitor pass and subsequently perform a query during step 1335 to determine the maximum number of parking spaces 414A the user 405 will be allowed to reserve based on accommodation data 430A and projection data 430C. Based on the results of the query, the processor 220 may take an action during step 1340. If the processor 220 determines that no visitor passes may be created due to parking load, the processor 220 may proceed to the terminate method step 1355. If the processor 220 determines that parking load allows for the creation of visitor passes, the processor 220 may cause the user interface 411 to ask the user 405 to enter input data pertaining to vehicle attributes of a vehicle 412 during step 1345. Once entered, the processor 220 may create a visitor pass using accommodation data 430A during step 1350, which may include vehicle attributes of the vehicle 412. The processor 220 may proceed to terminate method step 1355 once the visitor pass has been generated. In some preferred embodiments, the processor 220 may send the generated visitor pass to the user 405 prior to proceeding to terminate method step 1355.

Figure 14:
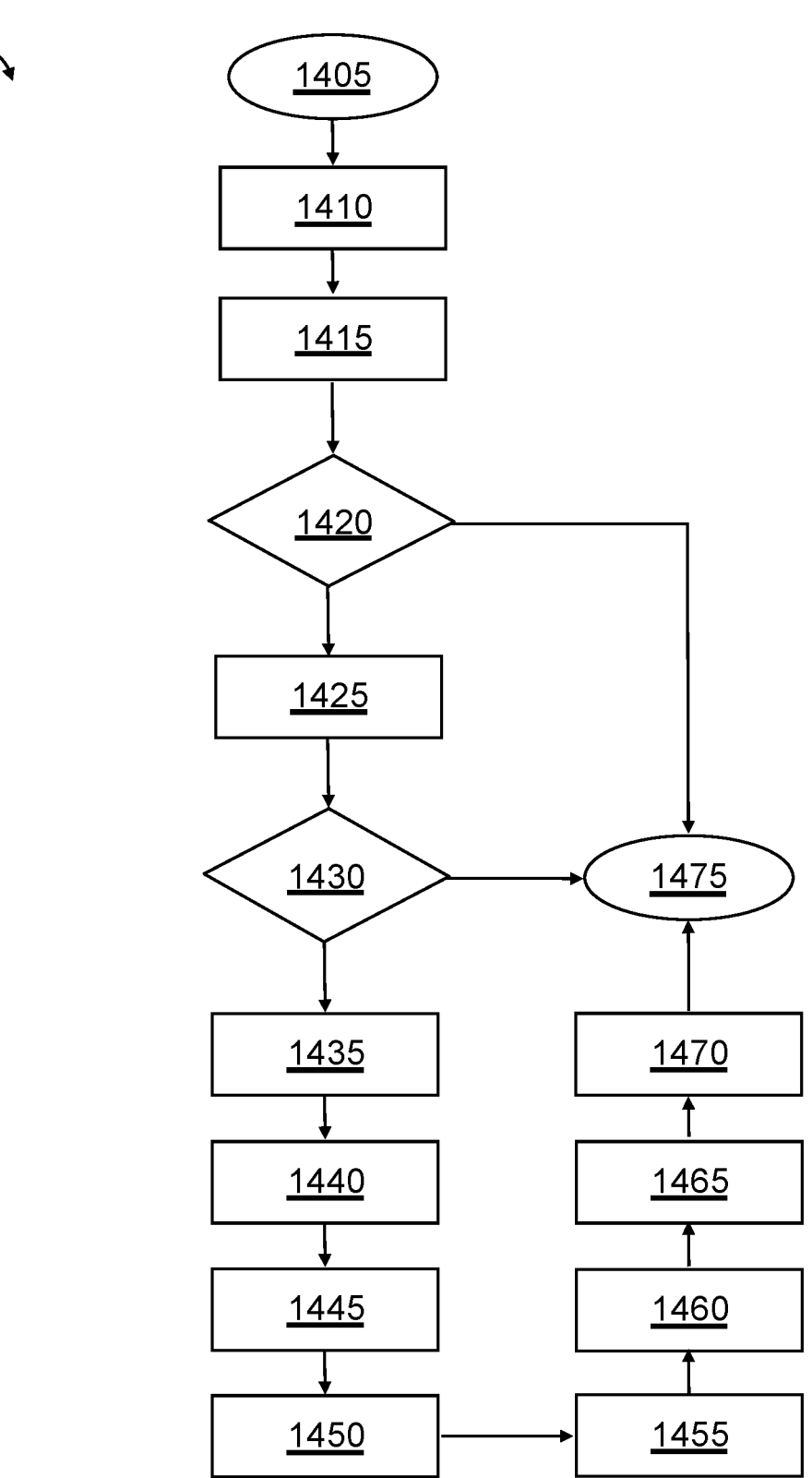
FIG. 14 is a flow chart illustrating certain method steps of a method embodying features consistent with the principles of the present disclosure.

FIG. 14 provides a flow chart 1400 illustrating certain, preferred method steps that may be used to carry out the method of creating owner passes. Step 1405 indicates the beginning of the method. During step 1410, the processor 220 may receive accommodation data 430A in the form of input data pertaining to an individual unit of a rental complex that is owned by a user 405. In a preferred embodiment, accommodation data 430A is entered into the system 400 previously by a user 405 having appropriate permission levels 1100 via the user interface 411, as illustrated in FIG. 5. During step 1415 the processor 220 may perform a query to determine if accommodation data 430A entered as input data matches accommodation data 430A of the system 400. Based on the results of the query, the processor 220 may take an action during step 1420. If the accommodation data 430A entered as input data does not match accommodation data 430A of the system 400, the processor 220 may proceed to the terminate method step 1475. If the accommodation data 430A entered as input data does match accommodation data 430A of the system 400, the processor 220 may proceed step 1425 and perform a query to determine if a conflicting accommodation would prevent the generation of an owner pass by checking the accommodation data 430A entered by the user 405 against other accommodation data 430A related to the individual unit that is owned by the user 405. Based on the results of the query, the processor 220 may take an action during step 1430. If the accommodation data 430A entered as input data conflicts with other accommodation data 430A related to the individual unit that is owned by the user 405, the processor 220 may proceed to the terminate method step 1475. If the accommodation data 430A entered as input data does not conflict with other accommodation data 430A related to the individual unit that is owned by the user 405, the processor 220 may cause the user interface 411 to present an indicium 605 that when selected will cause the system 400 to allow a user 405 to create an owner pass during step 1435. During step 1440, the processor 220 may receive input data pertaining to the selection of said indicium 605 for creating an owner pass and subsequently cause the user interface 411 to ask the user 405 to input accommodation data 430A pertaining to an individual unit during step 1445.

The system 400 may then perform a query during step 1450 to determine the total number of reservable parking spaces 414A the user 405 may reserve through the system 400, wherein the total number of reservable parking spaces 414A is related to threshold limits of the system 400. During step 1455, the processor 220 may cause the user interface 411 to ask the user 405 to choose a number of parking spaces 414A to reserve, wherein said number of parking spaces 414A to reserve is preferably no larger than the total number of reservable parking spaces 414A as determined by the system 400. The processor 220 may receive input data pertaining to the number of parking spaces 414A to reserve during step 1460 and subsequently ask a user 405 to enter input data pertaining to vehicle attributes of a vehicle 412 of the user 405 during step 1465. Once entered, the processor 220 may create an owner pass using accommodation data 430A during step 1470, which may include vehicle attributes of the vehicle 412. The processor 220 may proceed to terminate method step 1475 once the parking pass 413 has been generated. In some preferred embodiments, the processor 220 may send the generated parking pass 413 to the user 405 prior to proceeding to terminate method step 1475.

Figure 15:
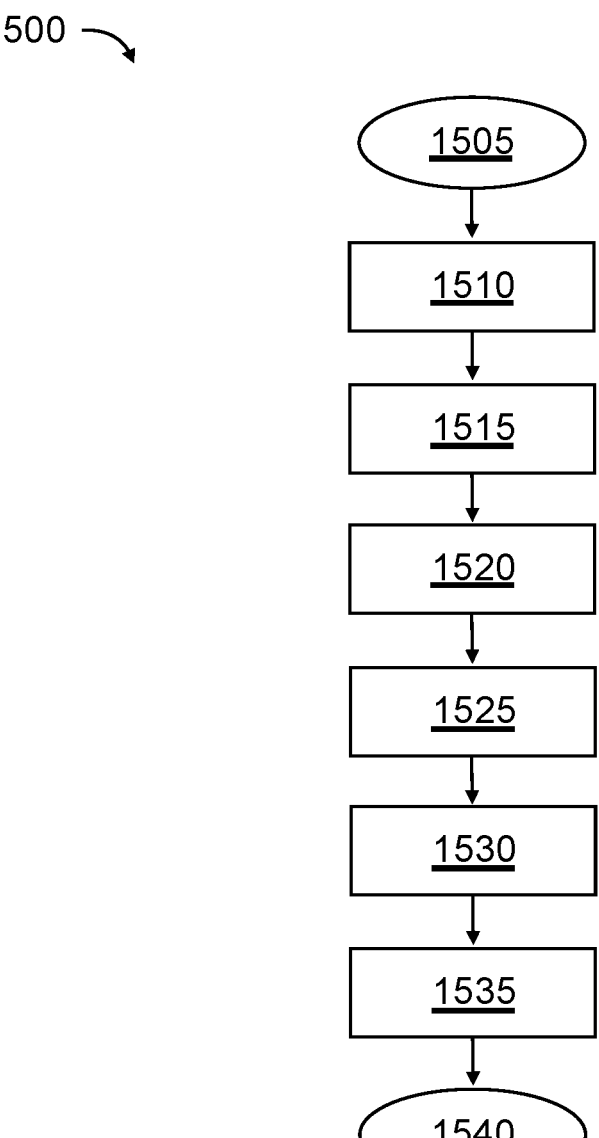
FIG. 15 is a flow chart illustrating certain method steps of a method embodying features consistent with the principles of the present disclosure.

FIG. 15 provides a flow chart 1500 illustrating certain, preferred method steps that may be used to carry out the method of determining a total number of employee passes and limiting a total number of reservable parking spaces 414A using said total number of employee passes. Step 1505 indicates the beginning of the method. During step 1510, the processor 220 may receive accommodation data 430A and projection data 430C from a database. Once received, the processor 220 may determine an amount of residential turnover by determining the amount of guest passes and owner passes that are set to expire for a given date during step 1515. The processor 220 may then use the projection data 430C and accommodation data 430A to determine the likelihood that parking load for a future data will be similar to parking load of a past date during step 1520. Once a likelihood has been determined, the processor 220 may estimate a total number of employees by determining a total amount of staff needed to efficiently run a rental complex on a given date during step 1525, wherein the total amount of staff includes, but is not limited to, an amount of managerial staff, cleaning staff, front desk staff, maintenance staff, or any combination thereof.

After the total amount of staff has been determined, the system 400 may estimate a total number of employee passes during step 1530. In a preferred embodiment, the total number of employee passes is equal to the total amount of staff. In another preferred embodiment, only certain categories of staff count towards the total number of employee passes. For instance, each managerial staff and maintenance staff may count towards an employee pass whereas cleaning staff and front desk staff may count as half an employee pass. The system 400 may then subtract the total number of employee passes from the maximum number of parking spaces 414A of a parking area 414 of a rental complex during step 1535 in order to create a modified maximum number of parking spaces 414A. In a preferred embodiment, the modified maximum number of parking spaces 414A is used to determine the number of reservable parking spaces 414A. Accordingly, in one preferred embodiment, the flexible threshold limit uses the modified maximum number of parking spaces 414A to determine the maximum number of rentable parking spaces 414A a user 405 may be allowed to reserve. Once the modified maximum number of parking spaces 414A has been created for a given date, the system 400 may proceed to the terminate method step 1540.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What is claimed is:

1. A system for preauthorizing a vehicle for a parking area comprising:
    a computing device having a user interface,
        wherein said user interface of said computing device is configured to receive input data in a way such that accommodation data is retrieved,
        wherein said accommodation data pertains to an accommodation at a rental complex having a plurality of individual units,
        wherein said accommodation is for an individual unit of said plurality of individual units of said rental complex,
        wherein said individual unit is associated with a parking space of a parking area of said rental complex,
        wherein a flexible threshold limit defines a maximum number of parking spaces associated with said individual unit,
        wherein a rigid threshold limit defines a minimum number of parking spaces associated with said individual unit,
    a database operably connected to said computing device via a network,
        wherein said accommodation data is stored on said database,
        wherein a plurality of rules and regulations is stored on said database,
        wherein said plurality of rules and regulations relate to said parking area of said rental complex,
    a processor operably connected to said computing device and said database,
    a non-transitory computer-readable medium coupled to said processor,
        wherein said non-transitory computer-readable medium contains instructions stored thereon, which, when executed by said processor, cause said processor to perform operations comprising:
        receiving said input data from said computing device,
        retrieving said accommodation data for said rental complex from said database based on said input data,
            wherein each said accommodation of a plurality of accommodations represented by said accommodation data of said rental complex has at least one reserved parking space associated therewith,
        determining a flexible threshold limit using said at least one reserved parking space of each said accommodation and said plurality of rules and regulations, presenting said flexible threshold limit via said user interface,
        receiving said input data from said computing device pertaining to a desired number of parking spaces for at least one vehicle,
            wherein said input data pertaining to said desired number of parking spaces for said at least one vehicle cannot exceed said flexible threshold limit,
        receiving said input data for at least one specific vehicle for said desired number of parking spaces,
        reserving said desired number of parking spaces based on said input data, and
        generating a parking pass having at least one unique pattern for each said desired number of parking spaces,
            wherein said at least one unique pattern of said parking pass is readable by a scanning device of said parking area,
            wherein said at least one unique pattern is associated with said at least one specific vehicle,
            wherein said at least one unique pattern is configured to convey said accommodation data and vehicle attributes of said at least one specific vehicle,
            wherein said accommodation data and said vehicle attributes are used to determine that a vehicle to which said parking pass is secured is authorized to park in said parking area of said rental complex.

2. The system of claim 1, wherein said parking pass is one of a guest pass, visitor pass, vendor pass, and employee pass.

3. The system of claim 2, wherein said flexible threshold limit represents a maximum number of rentable parking spaces for said individual unit, wherein said maximum number of rentable parking spaces is at most a difference between a total parking capacity minus a total number of guest passes, total number of visitor passes, total number of vendor passes, and total number of employee passes, wherein said maximum number of rentable parking spaces is no less than said rigid threshold limit.

4. The system of claim 1,
    further comprising additional instruction comprising:
        determining a parking demand for a date of said accommodation using said accommodation data,
            wherein said date of said accommodation data used to determine said parking demand differs by an accommodation year, and
        adjusting said flexible threshold limit using said parking demand.

5. The system of claim 4, wherein said parking demand estimates a percentage of available parking spots for said parking area on said date, wherein said flexible threshold limit is equal to said rigid threshold limit when parking demand reaches a maximum percentage of available parking.

6. The system of claim 1, wherein said at least one unique pattern comprises at least one of a barcode, QR code, license plate number, or pass ID number.

7. The system of claim 1, wherein a released space of an accommodation causes said flexible threshold limit to change, wherein said parking space is considered said released space when said desired number of parking spaces is less than said rigid threshold limit.

8. The system of claim 7, wherein said parking space is automatically considered a released space when said desired number of parking spaces for said accommodation is less than said rigid threshold limit for said accommodation, wherein said parking space is considered said released space after a beginning date of said accommodation.

9. The system of claim 7, wherein an additional space of an accommodation causes said flexible threshold limit to change, wherein said additional space is said parking space added to said accommodation.

10. The system of claim 1, wherein a second user has permissions that allow for said second user to override said flexible threshold limit.

11. A system for preauthorizing a vehicle for a parking area of a rental complex comprising:

a user interface of a computing device configured to present one or more fields to receive input data identifying an accommodation for an individual unit of a plurality of individual units of a rental complex;

a database operably connected to said computing device via a network and configured to store accommodation data for said accommodation, wherein said accommodation data associates said individual unit with at least one parking space of a parking area of said rental complex, wherein said accommodation data indicates, for each of a plurality of accommodations, at least one reserved parking space of said parking area, wherein said database is further configured to store rules and regulations relating to use of said parking area;

a processor operably connected to said computing device and said database and configured to determine, for said individual unit, a rigid threshold limit that defines a minimum number of parking spaces and a flexible threshold limit that defines a maximum number of parking spaces, wherein said processor is configured to determine said flexible threshold limit using (i) said at least one reserved parking spaces of said plurality of accommodations indicated in said accommodation data and (ii) said rules and regulations, wherein said user interface is configured to present an indication of said flexible threshold limit;

wherein said user interface is configured to receive a request to reserve a desired number of parking spaces for a specific vehicle associated with said accommodation, wherein said user interface is configured to receive said input data for at least one specific vehicle for said desired number of parking spaces, wherein said processor is configured to, in response to said desired number of parking spaces not exceeding said maximum number of parking spaces, reserve said desired number of parking spaces for said specific vehicle, wherein said processor is configured to cause generation of a parking pass including at least one unique pattern associated with said specific vehicle and said desired number of parking spaces, wherein said at least one unique pattern of said parking pass is readable by a scanning device of said parking area, wherein said at least one unique pattern is configured to convey said accommodation data and vehicle attributes of said at least one specific vehicle, and wherein said accommodation data and said vehicle attributes are used to determine that a vehicle to which said parking pass is secured is authorized to park in said parking area of said rental complex.

12. The system of claim 11, wherein said parking pass comprises one of a guest pass, visitor pass, owner pass, vendor pass, or employee pass, wherein said rigid threshold limits is different for at least two of said guest pass, visitor pass, owner pass, vendor pass, or employee pass.

13. The system of claim 11, wherein said flexible threshold limit represents a maximum number of rentable parking spaces for said individual unit, wherein said maximum number of rentable parking spaces is constrained to be at most a difference between (i) a total number of parking spaces available in said parking area and (ii) a sum of a total number of guest passes, visitor passes, vendor passes, and employee passes represented in said accommodation data, and wherein said flexible threshold limit is no less than said rigid threshold limit.

14. The system of claim 11, wherein said processor is configured to retrieve accommodation data pertaining to at least one prior accommodation for said individual unit having a same date on a different accommodation year than said accommodation, wherein said processor is configured to determine, from said accommodation data for said at least one prior accommodation, a parking demand for said same date on said different accommodation year, wherein said processor is configured to adjust said flexible threshold limit based at least in part on said parking demand.

15. The system of claim 14, wherein said processor is configured to determine said parking demand by estimating a percentage of available parking spaces for said parking area on said same date on said different accommodation year, and wherein said processor is configured to set said flexible threshold limit equal to said rigid threshold limit when said percentage of available parking spaces exceeds a maximum percentage of available parking.

16. The system of claim 11, wherein said at least one unique pattern comprises at least one of a barcode, QR code, license plate number, or pass identification number.

17. The system of claim 11, wherein said processor is configured to identify a parking space associated with said accommodation as a released space when, after a beginning date of said accommodation, accommodation data associated with said accommodation specifies fewer parking spaces than said rigid threshold limit, wherein said processor is configured to, in response to identifying said released space, increase a flexible threshold limit for at least one other user by an amount corresponding to said released space, wherein said processor is configured to, in response to receiving, via said user interface, input data requesting an additional parking space for said accommodation, decrease an available number of parking spaces for at least one other user such that a total number of reserved parking spaces for said parking area does not exceed a maximum number of parking spaces for said parking area.

18. A non-transitory computer-readable medium storing instructions that, when executed by at least one processor operably connected to a database and a user interface of a computing device, cause said at least one processor to perform steps comprising:

storing, in said database, accommodation data for a plurality of accommodations, wherein said accommodation data associates individual units of a rental complex with parking spaces of a parking area, wherein said accommodation data indicates, for each of said plurality of accommodations, at least one reserved parking space;

storing, in said database, projection data estimating a parking load for said parking area on a plurality of dates based at least in part on said accommodation data;

storing, in said database, threshold limit data defining, for at least one individual unit, a rigid threshold limit and a flexible threshold limit for reservable parking spaces associated with said at least one individual unit;

receiving, via said user interface, input data associated with a selected accommodation for a selected date;

retrieving, from said database based on said input data, said accommodation data, projection data, and threshold limit data relevant to said selected accommodation and said selected date;

determining whether to authorize use of said flexible threshold limit or said rigid threshold limit for a requested reservation of parking spaces associated with said selected accommodation based on said projection data and said threshold limit data;

receiving, via said user interface, a requested number of parking spaces associated with at least one specific vehicle;

comparing said requested number of parking spaces to whichever of said flexible threshold limit or said rigid threshold limit is authorized;

reserving, in said database, said requested number of parking spaces for said at least one specific vehicle associated with said selected accommodation when said requested number of parking spaces does not exceed said flexible threshold limit or said rigid threshold limit that was authorized; and generating a parking pass having at least one unique pattern for said requested number of parking spaces that were reserved, wherein said at least one unique pattern of said parking pass is readable by a scanning device, wherein said at least one unique pattern is associated with a said at least one specific vehicle, wherein said at least one unique pattern is configured to convey said accommodation data and vehicle attributes of said at least one specific vehicle, wherein said accommodation data and said vehicle attributes are used to determine that a vehicle to which said parking pass is secured is authorized to park in said parking area of said rental complex.

19. The non-transitory computer-readable medium of claim 18, wherein determining whether to authorize use of said flexible threshold limit or said rigid threshold limit comprises steps of:

performing at least one analysis of said projection data and upcoming accommodations represented by said accommodation data to determine a p-value;

identifying a defined percentage of a maximum parking capacity of said parking area;

authorizing use of said rigid threshold limit when said at least one analysis yields said p-value less than a predetermined value and indicates that said parking load on said selected date will exceed said defined percentage; and authorizing use of said flexible threshold limit when said at least one analysis yields said p-value less than said predetermined value and indicates that said parking load on said selected date will be less than said defined percentage, wherein said flexible threshold limit is constrained to be no more than twice said rigid threshold limit for said at least one individual unit.

20. The non-transitory computer-readable medium of claim 18, wherein said instructions further comprise:

determining, from said accommodation data, an amount of residential turnover for said selected date based at least in part on guest passes and owner passes scheduled to expire on said selected date;

estimating, based on said amount of residential turnover, a number of employees required to service said rental complex on said selected date;

calculating, from said number of employees, a total number of employee passes; and reducing a maximum number of reservable parking spaces for users other than employees by said total number of employee passes before determining said flexible threshold limit for said selected accommodation.

* * * * *